US012801516B2

(12) United States Patent
Abbas et al.

(10) Patent No.: US 12,801,516 B2
(45) Date of Patent: Nov. 17, 2026

(54) METHOD AND APPARATUS FOR DECODING CHANNEL CODES EMPLOYING COMPUTE-IN-MEMORY

(71) Applicant: The Hong Kong University of Science and Technology, Hong Kong (CN)

(72) Inventors: Syed Mohsin Abbas, Hong Kong (CN); Chi-Ying Tsui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 328 days.

(21) Appl. No.: 18/672,020

(22) Filed: May 23, 2024

(65) Prior Publication Data

US 2024/0411675 A1 Dec. 12, 2024

Related U.S. Application Data

(60) Provisional application No. 63/506,828, filed on Jun. 7, 2023.

(51) Int. Cl.
*G06F 11/3668* (2025.01)

(52) U.S. Cl.
CPC ...... *G06F 11/3692* (2013.01); *G06F 11/3688* (2013.01)

(58) Field of Classification Search
CPC ............. G06F 11/3692; G06F 11/3688; G06F 11/1012; H03M 7/6005; H04L 1/0045
USPC .......................................................... 714/799
See application file for complete search history.

(56) References Cited

U.S. PATENT DOCUMENTS 5,930,272 A * 7/1999 Thesling ............... H03M 13/19 714/752
11,381,260 B2 7/2022 Gross et al.
11,652,498 B2 5/2023 Duffy
11,784,666 B2 10/2023 Medard et al.
(Continued)

OTHER PUBLICATIONS

Syed Mohsin Abbas, Chi-Ying Tsui, Marwan Jalaleddine and Warren J. Gross, "Step-GRAND: A Low Latency Universal Soft-input Decoder," 2023 IEEE Globecom Workshops (GC Wkshps), 2023, 1668-1673.
(Continued)

*Primary Examiner* — James C Kerveros
(74) *Attorney, Agent, or Firm* — IDEA Intellectual Limited; Sam T. Yip

(57) ABSTRACT

A method and an apparatus for decoding channel codes received from a noisy communication channel are provided. The method comprises: demodulating the received channel codes to obtain a demodulated data vector; and decoding, using a compute-in-memory (CIM), the demodulated data vector to obtain one or more candidate output codewords, the demodulated data vector is decoded with a guessing random additive noise decoding (GRAND) algorithm to obtain a candidate output codeword. By leveraging CIM technique for GRAND implementation, due to the intrinsic small size of memory cells relative to logic gates, the integration of storing and computing operations (e.g. multiply-and-accumulate (MAC) operation on the input vector with the weight matrix) in memory cells enables concurrently evaluating a multitude error patterns, therefore substantially reduce the worst-case latency of GRAND hardware implementation.

18 Claims, 11 Drawing Sheets

(56) References Cited

U.S. PATENT DOCUMENTS

| | | | | |
|---|---|---|---|---|
| 2003/0165112 | A1* | 9/2003 | Noda | H04L 1/0041 370/203 |
| 2008/0148129 | A1* | 6/2008 | Moon | H03M 13/15 714/781 |
| 2021/0384918 | A1 | 12/2021 | Solomon et al. | |
| 2022/0107867 | A1* | 4/2022 | Wu | G06F 11/1068 |

OTHER PUBLICATIONS

Syed Mohsin Abbas, Marwan Jalaleddine and Warren J. Gross, "High-Throughput VLSI Architecture for GRAND Markov Order," 2021 IEEE Workshop on Signal Processing Systems (SiPS), 2021, 158-163.

Carlo Condo, Valerio Bioglio, Ingmar Land, "High-performance low-complexity error pattern generation for ORBGRAND decoding," 2021 IEEE Globecom Workshops (GC Wkshps), 2021, 1-6.

K. R. Duffy, A. Solomon, K. M. Konwar and M. Médard, "5G NR CA-Polar Maximum Likelihood Decoding by GRAND," 2020 54th Annual Conference on Information Sciences and Systems (CISS), 2020, 1-5.

K. R. Duffy, "Ordered Reliability Bits Guessing Random Additive Noise Decoding," ICASSP 2021—2021 IEEE International Conference on Acoustics, Speech and Signal Processing (ICASSP), 2021, 8268-8272.

K. R. Duffy and M. Médard, "Guessing random additive noise decoding with soft detection symbol reliability information—SGRAND," 2019 IEEE International Symposium on Information Theory (ISIT), 2019, 480-484.

S. M. Abbas, T. Tonnellier, F. Ercan and W. J. Gross, "High-Throughput VLSI Architecture for GRAND," 2020 IEEE Workshop on Signal Processing Systems (SiPS), 2020, 1-6.

S. M. Abbas, T. Tonnellier, F. Ercan, M. Jalaleddine and W. J. Gross, "High-Throughput and Energy-Efficient VLSI Architecture for Ordered Reliability Bits GRAND," IEEE Transactions on Very Large Scale Integration (VLSI) Systems, 2022, 681-693.

A. Riaz, V. Bansal, A. Solomon, W. An, Q. Liu, K. Galligan, K. R. Duffy, M. Medard and R. T. Yazicigil, "Multi-Code Multi-Rate Universal Maximum Likelihood Decoder using GRAND," ESSCIRC 2021—IEEE 47th European Solid State Circuits Conference (ESSCIRC), 2021, 239-246.

C. Condo, "A fixed latency ORBGRAND decoder architecture with LUT-aided error-pattern scheduling," IEEE Transactions on Circuits and Systems I: Regular Papers, 2022, vol. 69, No. 5, 2203-2211.

K. R. Duffy, J. Li and M. Médard, "Capacity-Achieving Guessing Random Additive Noise Decoding," IEEE Transactions on Information Theory, 2019, vol. 65, No. 7, 4023-4040.

A. Solomon, K. R. Duffy and M. Médard, "Soft Maximum Likelihood Decoding using GRAND," ICC 2020—2020 IEEE International Conference on Communications (ICC), 2020, 1-6.

S. M. Abbas, T. Tonnellier, F. Ercan, M. Jalaleddine and W. J. Gross, "High-Throughput VLSI Architecture for Soft-Decision Decoding with ORBGRAND," ICASSP 2021—2021 IEEE International Conference on Acoustics, Speech and Signal Processing, 2021, 8288-8292.

K. Pagiamtzis and A. Sheikholeslami, "Content-Addressable Memory (CAM) Circuits and Architectures: A Tutorial and Survey," IEEE Journal of Solid-State Circuits, 2006, vol. 41, No. 3, 712-727.

* cited by examiner

METHOD AND APPARATUS FOR DECODING CHANNEL CODES EMPLOYING COMPUTE-IN-MEMORY

FIELD OF THE INVENTION

The present disclosure relates to the field of data decoding. More particularly, the present disclosure relates to a method and an apparatus for decoding channel codes received from a noisy communication channel with a guessing random additive noise decoding (GRAND) algorithm using compute-in-memory (CIM).

BACKGROUND OF THE INVENTION

The interest in short channel codes and the corresponding decoding algorithms has recently been ignited in both industry and academia due to emergence of applications with strict reliability and ultra-low latency requirements. GRAND has been used as a universal decoding technique for linear block codes with short length and high rates. Conventionally, hardware implementation of GRAND relies on registers, logic gates and other peripheral circuitry to enable checking of multiple test error patterns for codebook membership. Such hardware implementation requires huge overhead in terms of logic gates and complicates the interconnections circuitry. Therefore, only a limited number of error patterns can be evaluated in parallel, and this limited parallelization factor is the major bottle neck in reducing the worst-case decoding latency of hardware implementation of GRAND. Reducing the worst-case decoding latency for hardware implementation of GRAND is crucial for mission-critical applications that have stringent requirements for ultra-low latency. Hence, there is still room for improvement in hardware implementation of GRAND to further reduce the worst-case decoding latency.

SUMMARY OF THE INVENTION

It is an objective of the present invention to provide a GRAND hardware implementation solution with reduced decoding latency.

In accordance with a first aspect of the present invention, an apparatus for decoding channel codes received from a noisy communication channel is provided. The apparatus comprises: a demodulator configured to demodulate the received channel codes to obtain a demodulated data vector; a syndrome computer configured to compute a data vector syndrome for the demodulated data vector; a controller configured to receive the data vector syndrome and formulate a search key with the data vector syndrome respectively; a compute-in-memory configured to: store a plurality of pre-computed test error pattern syndromes; receive the search key from the controller; concurrently evaluate the plurality of test error pattern syndromes under a codebook membership criterion with the search key; and determine an address of a candidate test error pattern corresponding to a candidate test error pattern syndrome that satisfy the codebook membership criterion; and a word-generation module configured to: use the determined address to retrieve indices of non-zero elements of the candidate test error pattern; and generate a candidate output codeword based on the retrieved indices of non-zero elements of the test error pattern and the input data vector.

In accordance with a second aspect of the present invention, a method for decoding channel codes received from a noisy communication channel is provided. The method comprises: demodulating the received channel codes; decoding the one or more input codewords to obtain one or more candidate output codewords, each input codeword is decoded with a guessing random additive noise decoding algorithm to obtain a candidate output codeword by: computing a syndrome for the input data vector; formulating a search key with the data vector syndrome; evaluating a plurality of test error pattern syndromes under a codebook membership criterion with the search key; determining an address of a candidate test error pattern corresponding to a candidate test error pattern syndrome that satisfy the codebook membership criterion; using the determined address to retrieve indices of non-zero elements of the candidate test error pattern; and generating the candidate output codeword based on the retrieved indices of non-zero elements of the test error pattern and the input data vector; and wherein the plurality of test error pattern syndromes is pre-computed and stored in the compute-in-memory; and wherein the plurality of test error pattern syndromes is concurrently evaluated with the codebook membership criterion based on the data vector syndrome by the compute-in-memory.

By leveraging CIM technique for GRAND implementation, due to the intrinsic small size of memory cells relative to logic gates, the integration of storing and computing operations (e.g. multiply-and-accumulate (MAC) operation on the input vector with the weight matrix) in memory cells enables evaluating concurrently a multitude of error patterns in parallel therefore substantially reduces the worst-case latency of GRAND implementation.

BRIEF DESCRIPTION OF THE DRAWINGS

Embodiments of the invention are described in more details hereinafter with reference to the drawings, in which.

DETAILED DESCRIPTION

In the following description, embodiments are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
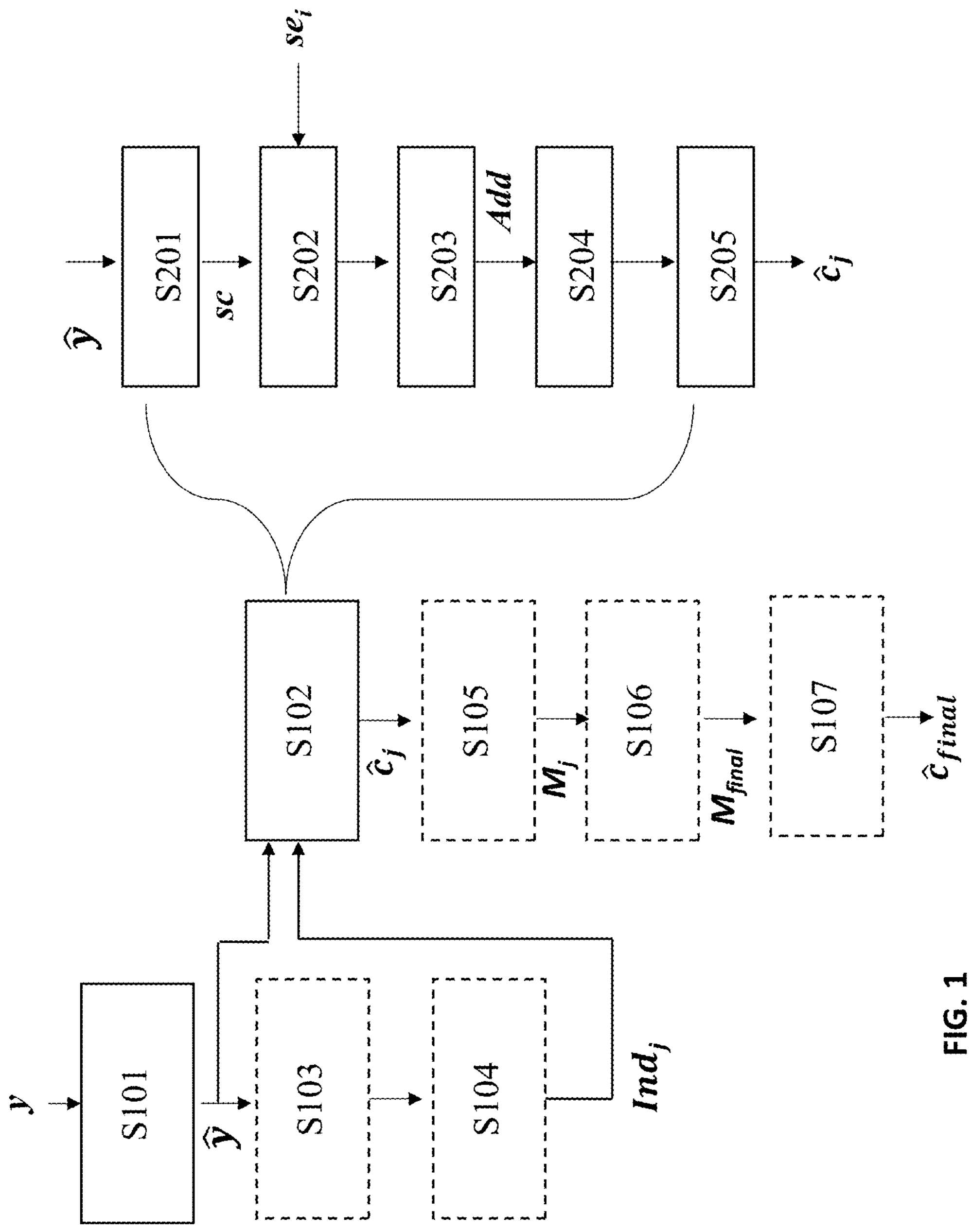
FIG. 1 shows a flowchart of a method to implemented in a data receiver for decoding channel codes y received from a data sender over a noisy communication channel according to one embodiment of the present invention.

FIG. 1 depicts a flowchart of a method S100 to implemented in a data receiver for decoding channel codes y received from a data sender over a noisy communication channel according to one embodiment of the present invention. As shown, the method comprises:

Step S101: demodulating the received channel codes y to obtain a demodulated data vector $\hat{y}$.

Step S102: decoding the demodulated data vector $\hat{y}$ to obtain one or more candidate output codewords $\hat{c}_j$.

In step S102, the demodulated data vector $\hat{y}$ is decoded with a guessing random additive noise decoding algorithm to obtain one or more candidate output codewords $\hat{c}_j$ by the following steps:

S201: computing a data vector syndrome sc for the demodulated data vector;

S202: evaluating a plurality of test error pattern (TEP) syndromes $se_i$ with a codebook membership criterion based on the data vector syndrome sc;

S203: determining addresses Add of the candidate test error patterns corresponding to the candidate test error pattern syndromes that satisfy the codebook membership criterion;

S204: using the determined addresses Add to retrieve indices of non-zero elements of the candidate test error patterns; and

S205: generating the candidate output codewords $\hat{c}_j$ based on the retrieved indices of non-zero elements of the test error patterns and the demodulated data vector $\hat{y}$.

The plurality of TEP syndromes $se_i$ may be pre-computed from a plurality of test error patterns respectively and stored in a compute-in-memory (CIM); and the plurality of TEP syndromes $se_i$ is evaluated concurrently for the codebook membership criterion by the CIM.

More specifically, the GRAND algorithm is performed by applying the generated TEP e to the demodulated vector $\hat{y}$ and verifying the resultant vector for codebook memberships as follows:

$$H\cdot(\hat{y}\oplus e)^T=0, \tag{1}$$

where H represents a parity check matrix corresponding to the underlying linear block code.

If the codebook membership verification Equation (1) is satisfied, e is the guessed noise and $$\hat{c}\triangleq\hat{y}\oplus$$

e is the estimated codeword.

For checking the TEPs with Hamming weight of 1 ($e=\mathbb{1}_i\forall i\in[1, n]$), the codebook membership verification Equation (1) can be expanded as follows:

$$H\cdot(\hat{y}\oplus\mathbb{1}_i)^T=H\cdot\hat{y}^T\oplus H\cdot\mathbb{1}_i^T, \tag{2}$$

where $H\cdot\hat{y}^T$ (denoted as sc) represents the (n−k)-bits syndrome for the demodulated data vector $\hat{y}$ and $H\cdot\mathbb{1}_i^T$ (denoted as se) is the (n−k)-bits syndrome for the TEP (e) with Hamming weight of 1 ($\mathbb{1}_i$).

In a similar manner, for verifying error patterns with Hamming weight>1, we can leverage the underlying code's linearity property to aggregate t syndromes of error patterns with a Hamming weight of 1 ($\mathbb{1}_i$), and then generate syndromes that correspond to an error pattern with a Hamming weight of t ($se_{1,2,\ldots,t}=H\cdot\mathbb{1}_1^T\oplus H\cdot\mathbb{1}_2^T\ldots\oplus H\cdot\mathbb{1}_t^T$). For example, the codebook membership for TEPs with Hamming weight 2, $e=\mathbb{1}_{i,j}$ with $i\in[1\ldots n]$, $j\in[1\ldots n]$ and $i\neq j$, can be checked as $$H\cdot(\hat{y}\oplus\mathbb{1}_{i,j})^T=H\cdot\hat{y}^T\oplus H\cdot\mathbb{1}_i^T\oplus H\cdot\mathbb{1}_j^T, \tag{3}$$

The codebook membership verification (1) can be simplified as:

$$H\cdot(\hat{y}\oplus e)^T\Rightarrow H\cdot\hat{y}^T\oplus H\cdot e^T\Rightarrow sc\oplus se\Rightarrow sc\cdot\overline{se}+\overline{sc}\cdot se, \tag{4}$$

This means that for any generated TEP (e), the codebook membership (1) is decomposed into summation of terms $sc\cdot\overline{se}$ and $\overline{sc}\cdot se$. For any TEP (e), the codebook membership is satisfied if the summation $sc\cdot\overline{se}+\overline{sc}\cdot se$ yields a (n−k)-bit zero vector (0) for that TEP (e).

In other words, the codebook membership evaluation may be performed by computing a complement of the data vector syndrome ($\overline{sc}$); computing a complement of each of the plurality of TEP syndromes ($\overline{se}$); storing the plurality of TEP syndromes in a first sub-memory in the CIM; storing the plurality of complements of TEP syndromes in a second sub-memory in the CIM; obtaining a first intermediate output by performing a bitwise-AND of the data vector syndrome (sc) with the complement of the TEP syndrome ($\overline{se}$) by the first sub-memory ($sc\cdot\overline{se}$).

Then each TEP syndrome is evaluated by: obtaining a second intermediate output by performing a bitwise-AND of the complement of the data vector syndrome ($\overline{sc}$) with the TEP syndrome (se) by the second sub-memory ($\overline{sc}\cdot se$); and determining that the TEP syndrome satisfies the codebook membership criterion if a summation of the first intermediate output and the second intermediate output yields a zero vector ($sc\cdot\overline{se}+\overline{sc}\cdot se==0$).

The received channel codes y may be demodulated on basis of a hard-decision algorithm to obtain a hard-decided vector $\hat{y}$ during a first phase of decoding. The syndrome sc is then computed for the hard-decided vector $\hat{y}$. If the syndrome sc yields 0, which implies that the hard-decided vector $\hat{y}$ is noise-free and is a valid codeword, decoding is assumed to be successful. Otherwise, the decoding is continued and moved to a next phase where the received channel codes y is further demodulated on basis of a soft-decision algorithm to obtain a soft-decided vector (y).

Before the plurality of candidate output codewords $\hat{c}_j$ is obtained by decoding the soft-decided vector (y), the method further comprises:

S103: sorting the plurality of soft-decided vector elements $y_j$ of the soft-decided vector (y) according to a reliability order; and

S104: returning a plurality of ordering indices $Ind_j$ for the plurality of soft-decided vector elements $y_j$ respectively.

In one embodiment, the reliability order may be an ascending order of absolute values $|y_j|$ of the plurality of the soft-decided vector elements $y_j$.

After a plurality of candidate output codewords $\hat{c}_j$ is obtained by decoding the soft-decided vector (y), the method further comprises the following steps:

S105: calculating a likelihood value $M_j$ for each of the one or more candidate output codewords $\hat{c}_j$;

S106: selecting a highest likelihood value $M_{final}$ by comparing the one or more likelihood values with a comparator tree; and

S107: identifying, a most likely candidate codeword that has the highest likelihood value is identified and returned as the final estimated output codeword $\hat{c}_{final}$.

Figure 2:
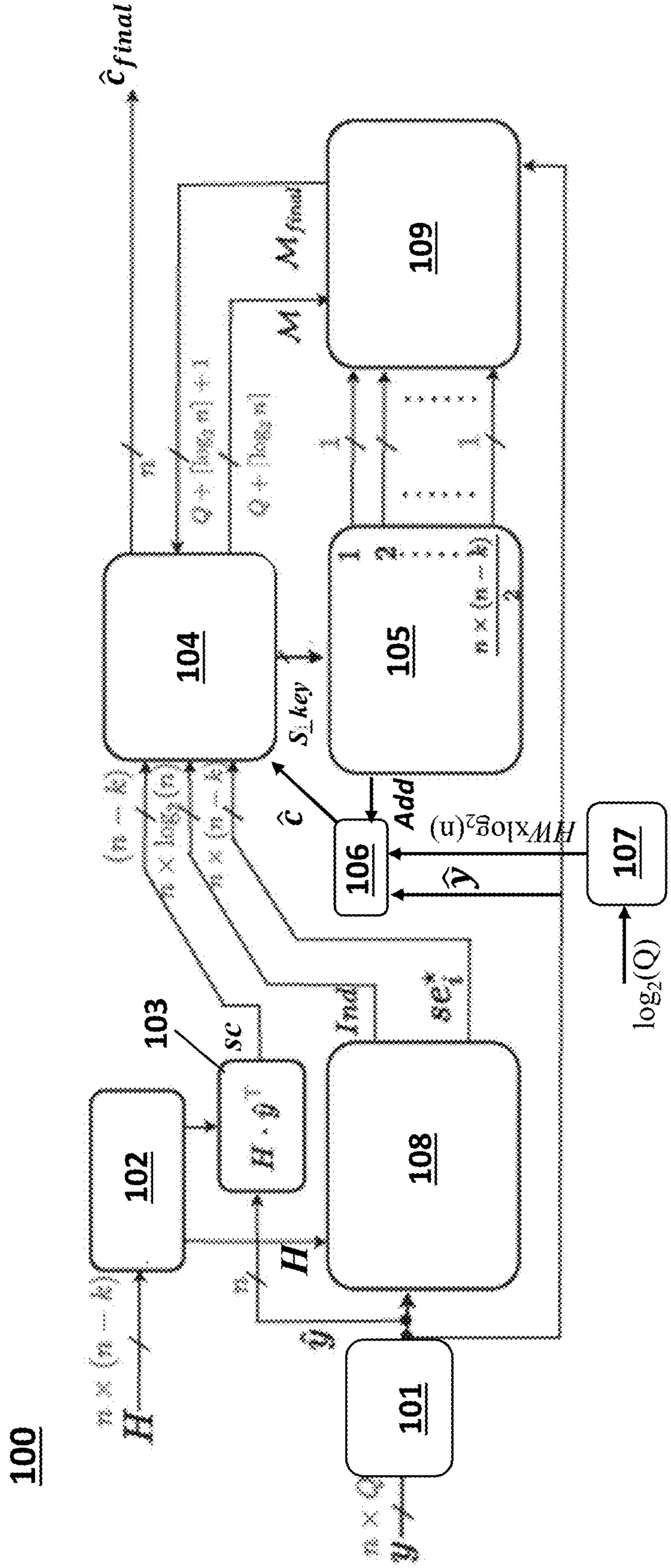
FIG. 2 shows a very large-scale integration (VLSI) architecture of an apparatus for decoding channel codes received from a noisy communication channel according to one embodiment of the present invention.

FIG. 2 shows a very large scale integration (VLSI) architect of an apparatus 100 for decoding channel codes received from a noisy communication channel according to one embodiment of the present invention. The apparatus comprises a demodulator 101, a parity check matrix memory 102, a syndrome computer 103, a controller 104, a CIM 105 and a word-generation module 106.

The demodulator 101 is configured to demodulate the received channel codes y to obtain a demodulated data vector $\hat{y}$.

The parity check matrix memory 102 is configured to store a (n−k)×n-bit parity check matrix H. The syndrome computer 103 is configured to retrieve the parity check matrix H from the parity check matrix memory 102 and apply the parity check matrix H on hard-decided vector $\hat{y}$ to compute a (n−k)-bit data vector syndrome sc.

The controller 104 is configured to receive the data vector syndrome sc and formulate a search key S_key for performing a codebook membership evaluation.

The CIM 105 may be configured to: store a plurality of pre-computed TEP syndromes $se_i$; receive the search key S_key and concurrently evaluate the plurality of TEP syndromes $se_i$ under a codebook membership criterion with the search key S_key; and determine, an address Add of a candidate TEP corresponding to a candidate TEP syndrome that satisfy the codebook membership criterion.

The word-generation module 106 is configured to, use the determined address Add to retrieve indices of non-zero elements of the candidate TEP from an index memory 107; and generate a candidate output codeword $\hat{c}_j$ based on the retrieved indices of non-zero elements of the candidate TEP and the hard-decided vector $\hat{y}$.

The demodulator 101 may be configured to demodulate the received channel codes y on basis of a hard-decision algorithm to obtain a hard-decided (or hard-input) vector.

In one exemplary implementation of soft-input GRAND, the demodulator 101 may further be configured to demodulate the received channel codes on basis of a soft-decision algorithm to obtain a soft-decided (or soft-input) vector.

Figure 3:
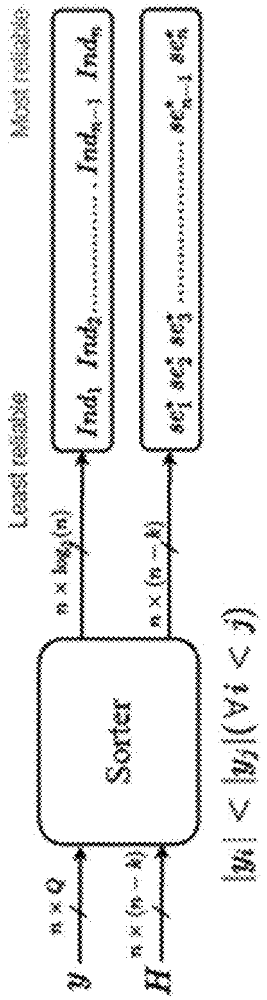
FIG. 3 shows a VLSI microstructure of a sorter module according to one embodiment of the present invention.

The apparatus 100 may further include a sorter module 108 (as shown in FIG. 3) configured for sorting the elements $y_j$ of the soft-decided vector.

More specifically, the sorter module 108 may be configured to: sort the plurality of soft-decided vector elements $y_j$ according to a reliability order of the plurality of received data elements $y_j$; and return a plurality of ordering indices ($Ind_i$, $\forall i \in [1, n]$) for the plurality of soft-decided vector elements $y_j$ respectively.

The controller 104 may be further configured to calculate a likelihood value $M_j$ for each of a plurality of candidate output codewords $\hat{c}_j$.

The apparatus 100 further comprises a most likely candidate selection (MLCS) module 109 configured to select a highest likelihood value $M_{final}$ by comparing the plurality of likelihood values $M_j$ with a comparator tree and return the selected likelihood value $M_{final}$ to the controller. The controller 104 is then further configured to identify, among a plurality of candidate output codewords $\hat{c}_j$ generated by the word-generation module 106, a most likely candidate codeword that has the highest likelihood value as a final estimated codeword $\hat{c}_{final}$.

In some embodiments, as shown in FIG. 3, the sorter module 108 may further be configured to receive the parity check matrix H from the parity check matrix memory and generate a plurality of sorted TEP syndromes ($se_i^*$, $\forall i \in [1, n]$).

Accordingly, the controller 104 may be further configured to receive the sorted TEP syndromes $se_i^*$ and formulate the search key S_key with the data vector syndrome sc and the sorted TEP syndromes $se_i^*$.

The CIM 105 may be configured to store all the (n−k)-bit syndromes ($se_i \oplus se_j$) associated with error patterns with a Hamming weight of 2 ($e=1_{i,j}$ with $i \in [1 \ldots n]$, $j \in [1 \ldots n]$ and $i \neq j$). There are $$\binom{n}{2}$$

TEPs with Hamming weight 2 for a linear block code of length n. These $$\binom{n}{2}$$

Figure 4:
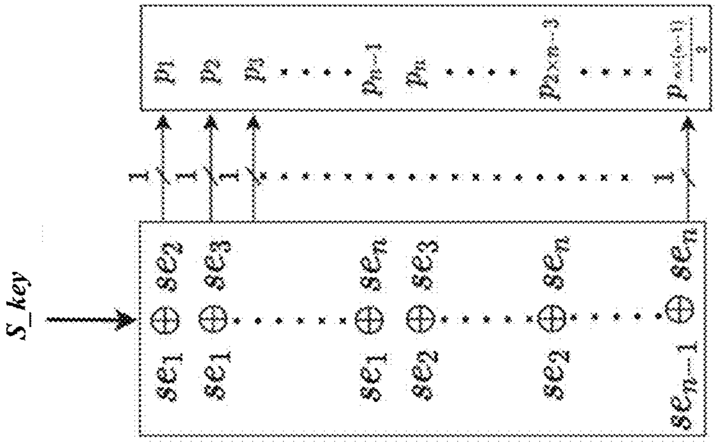
FIG. 4 shows how a search key is applied to a compute-in-memory (CIM) according to one embodiment of the present invention.

TEP syndromes are computed offline using H and are stored in CIM 105 as shown in FIG. 4. The syndromes ($se_i \oplus se_j$) stored in CIM 105 depend only on H and are not impacted by the sorter module; as a result, the contents of CIM 105 do not change with each received channel codes from the channel.

The CIM 105 may be configured to generate a plurality of output parity bits $$\left(p_k, \forall k \in \left[1, \binom{n}{2}\right]\right)$$

such that:

$$p_k = \begin{cases} 1, & \text{if } (S_{key} == se_i \oplus se_j) \\ 0, & \text{if } (S_{key} \neq se_i \oplus se_j) \end{cases}$$

The parity bits $p_k$ output by the CIM 105 are passed to the MLCS module 109. The MLCS module 109 finds the most likely codeword from the candidate codewords that satisfy the codebook membership constraint, that is, by solving the problem:

$$\hat{c}_{MostLikely} \leftarrow \arg \max_{\hat{c} \in Candidates} \left( \sum_{i=1}^{n} [(-1)^{\hat{c}_i} y_i] \right)$$

The candidate codewords correspond to CIM entries that matched the applied search key ($p_k$=1).

Figure 5:
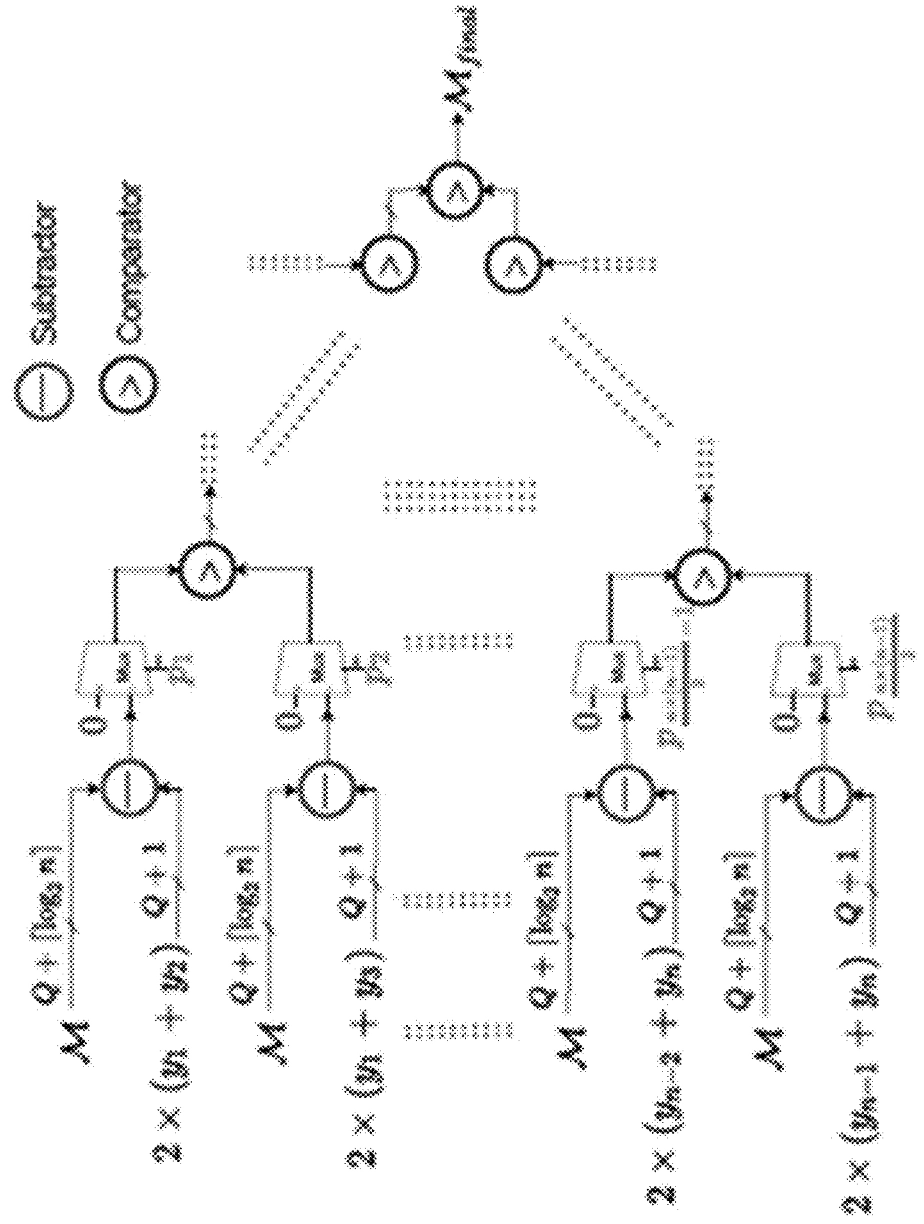
FIG. 5 shows a VLSI microstructure of a most likely candidate selection (MLCS) module according to one embodiment of the present invention

FIG. 5 shows a microarchitecture of the MLCS module 109, that accepts as inputs the likelihood value $$M \leftarrow \sum_{i=1}^{n} [y_i]$$

from the controller and the vector of parity bits $p_k$, $$\forall k \in \left[1, \binom{n}{2}\right]$$

from the CIM. The likelihood value of the candidate codewords ($M_{Candidates}$) is computed as follows:

$$M_{Candidates} = \begin{cases} M - 2 \times (y_i + y_j), \text{ if } (S_{ket} == se_i \otimes se_j) \\ 0, \text{ if } (S_{key} \neq se_1 \otimes se_j) \end{cases}$$

for i∈[1 . . . n], j∈[1 . . . n] and i≠j

The highest likelihood value $M_{final}$ among the candidates $M_{Candidates}$ is selected using a comparators tree with $$\log_2\left(\frac{n \times (n-1)}{2}\right)$$

stages. The highest likelihood value $M_{final}$ is then forwarded to the controller 104 (see FIG. 2), which generates the final estimated codeword $\hat{c}_{final}$.

Figure 6:
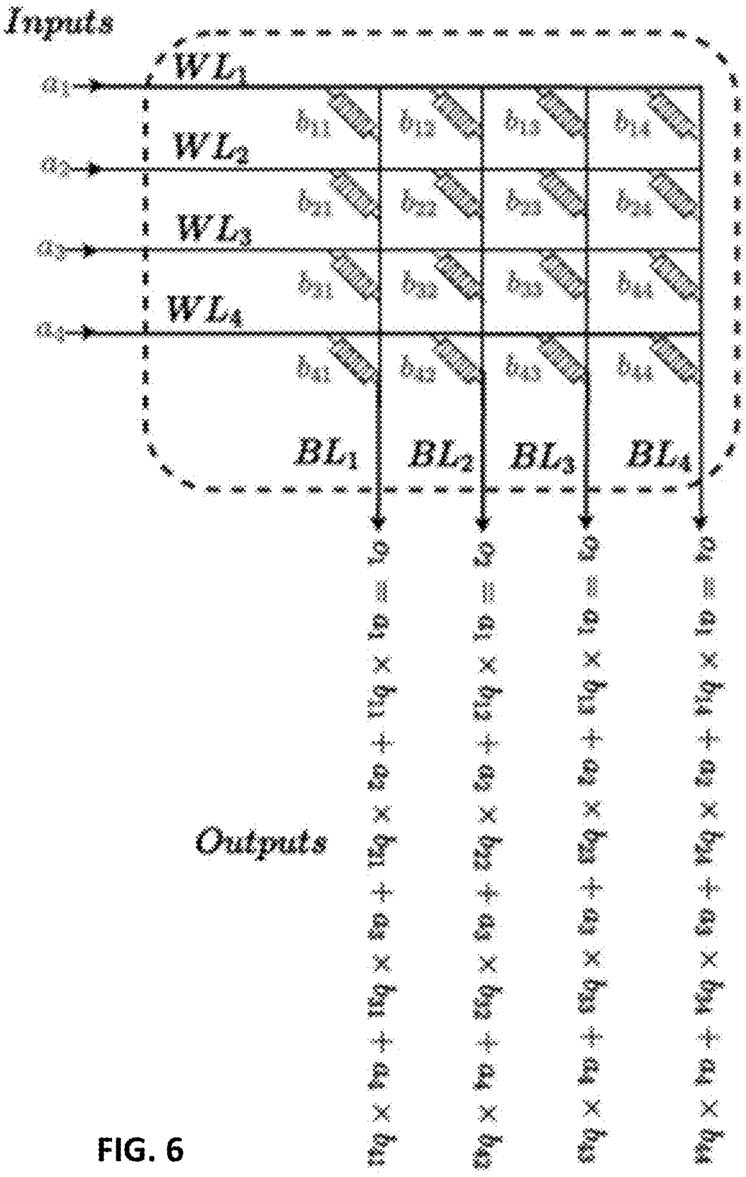
FIG. 6 shows an exemplary 4×4 resistive random-access memory (ReRAM)

In one exemplary implementation, the simplified codebook membership verification (4) may be implemented by using non-volatile resistive random-access memory (ReRAM)-based CIM. FIG. 6 shows an exemplary 4×4 ReRAM, which is configured to facilitate the multiply-and-accumulate (MAC) operation for input vector $\alpha_i \forall$ i∈[1, 4] with the matrix elements $b_{ij} \forall$ i∈[1, 4], ∀ j∈[1, 4] stored in the memory. The outputs of the ReRAM is the MAC output $$o_j = \sum_{1}^{4} a_i \times b_{ij} \forall\, i \in [1, 4], \forall\, j \in [1, 4].$$

Figure 7:
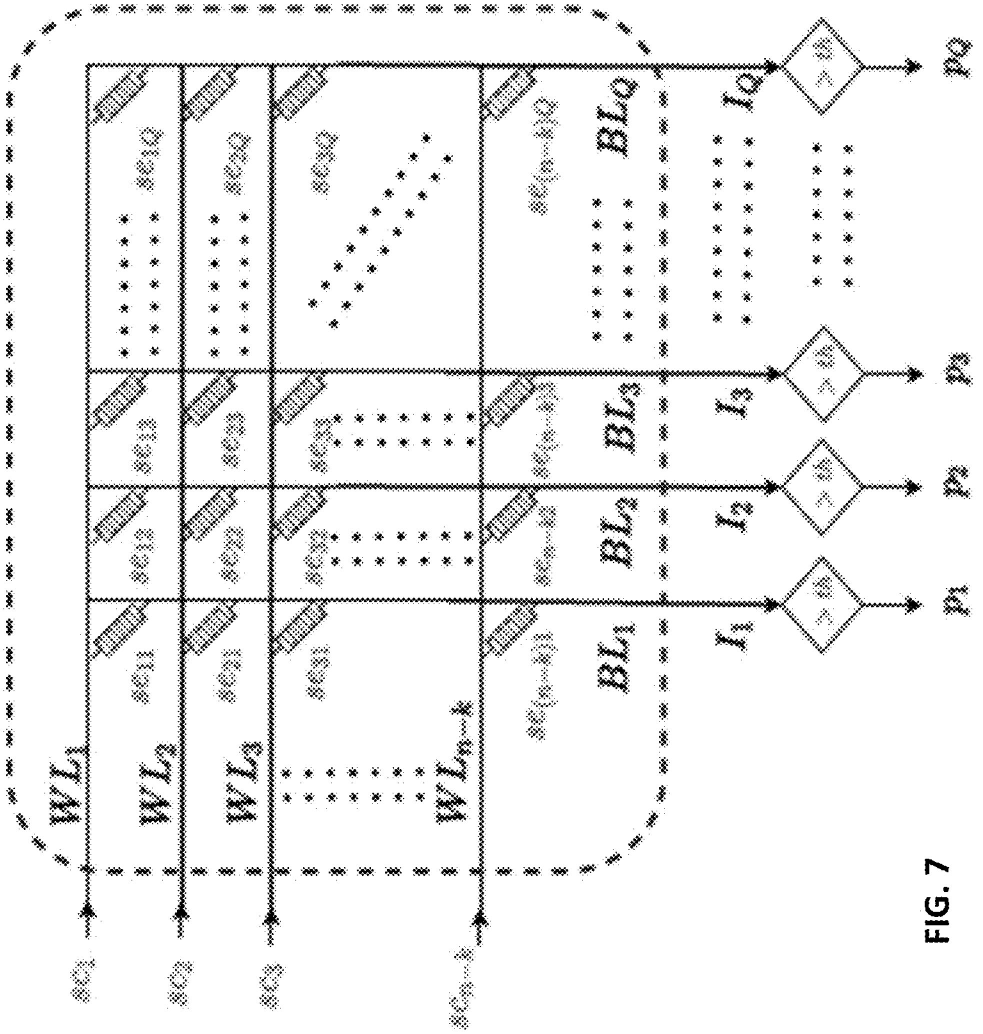
FIG. 7 shows how the GRAND algorithm is implemented on a ReRAM.

FIG. 7 shows how the GRAND algorithm is implemented on a ReRAM. The (n−k)×Q matrix of pre-computed TEP syndromes $se_{i,j}$ (with i∈[1 . . . (n−k)], j∈[1 . . . Q]) is stored in ReRAM, and the syndrome of the received channel codes (sc) is applied to ReRAMs input. The parameter Q denotes the maximum number of TEPs.

Furthermore, every element of both the TEP syndrome se and the data vector syndrome sc is either a 0 or a 1 (∀ $sc_i$∈[0, 1], ∀ $se_i$∈[0, 1] and ∀ i∈[1, (n−k)]). A high-resistance state or a low-resistance state for ReRAM can be used to represent the 0 or 1 for the ReRAM.

The MAC results $$o_j = \sum_{1}^{(n-k)} a_i \times b_{ij} \forall\, i \in [1, (n-k)], \forall\, j \in [1, Q]$$

produced by the ReRAM. Furthermore, a current sense amplifier is employed at each output MAC result $o_i \forall$ i∈[1, Q] and the output $p_i$($p_i$∈[0, 1]) of the sense amplifier is 0 if the current produced $I_i$ by the MAC result $o_i$ is below a specific threshold $I_{th}$. The symbol $p_i$ represents the outputs of sense amplifiers and given by:

$$p_i = \begin{cases} 1, & I_i \geq I_{th} \\ 0, & I_i < I_{th} \end{cases}$$

Figure 8:
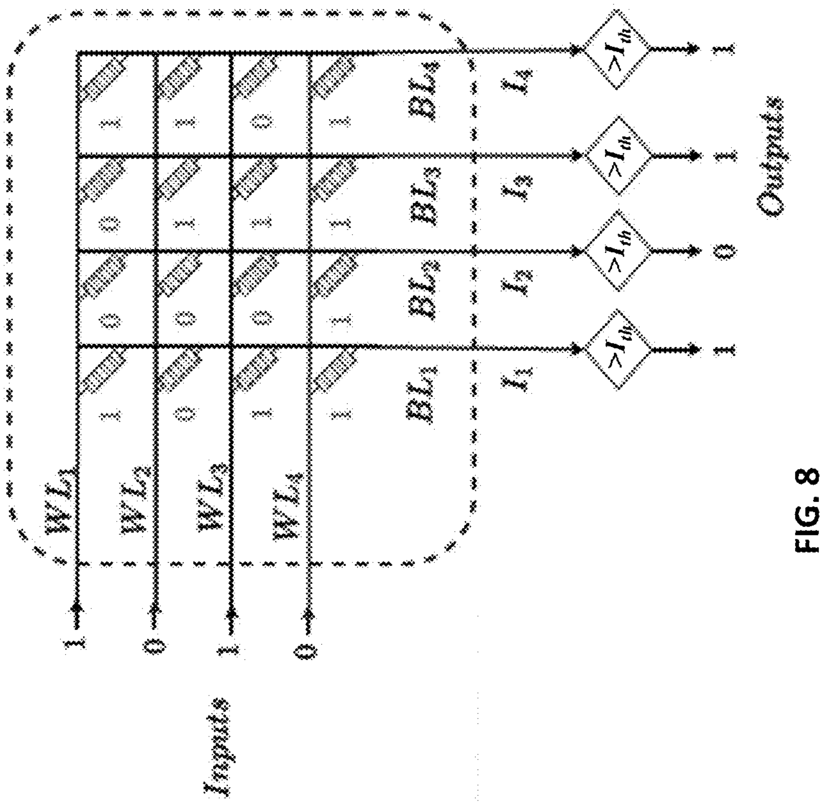
FIG. 8 shows an example ReRAM that stores a 4×4 matrix of TEP syndromes according to one embodiment of the present invention.

FIG. 8 shows an example ReRAM that stores a 4×4 matrix of TEP syndromes $se_i$, j (with i∈[1 . . . 4], j∈[1 . . . 4]). At the inputs of ReRAM, the syndrome of the received channel codes sc is applied. The corresponding word line in ReRAM is not active if any element of the input vector $sc_i$, ∀ i∈[1, 4] is 0. Depending on whether the output current $I_i$ of the bit line is below or above the particular threshold $I_{th}$, the sense amplifier deployed at the ReRAM output (MAC results $$o_j = \sum_{1}^{4} sc_j \times se_{ij} \forall\, i \in [1, 4], \forall\, j \in [1, 4])$$

generates a 0 or a 1.

As seen in FIG. 5, second output ($p_2$=0) produces a 0 because the MAC result for sc(sc=[1 0 1 0]) and se (se=[0 0 0 1]) is 0 ($o_2$=1×0+0×0+1×0+0×1=0), whereas all other outputs generate 1.

Figure 9:
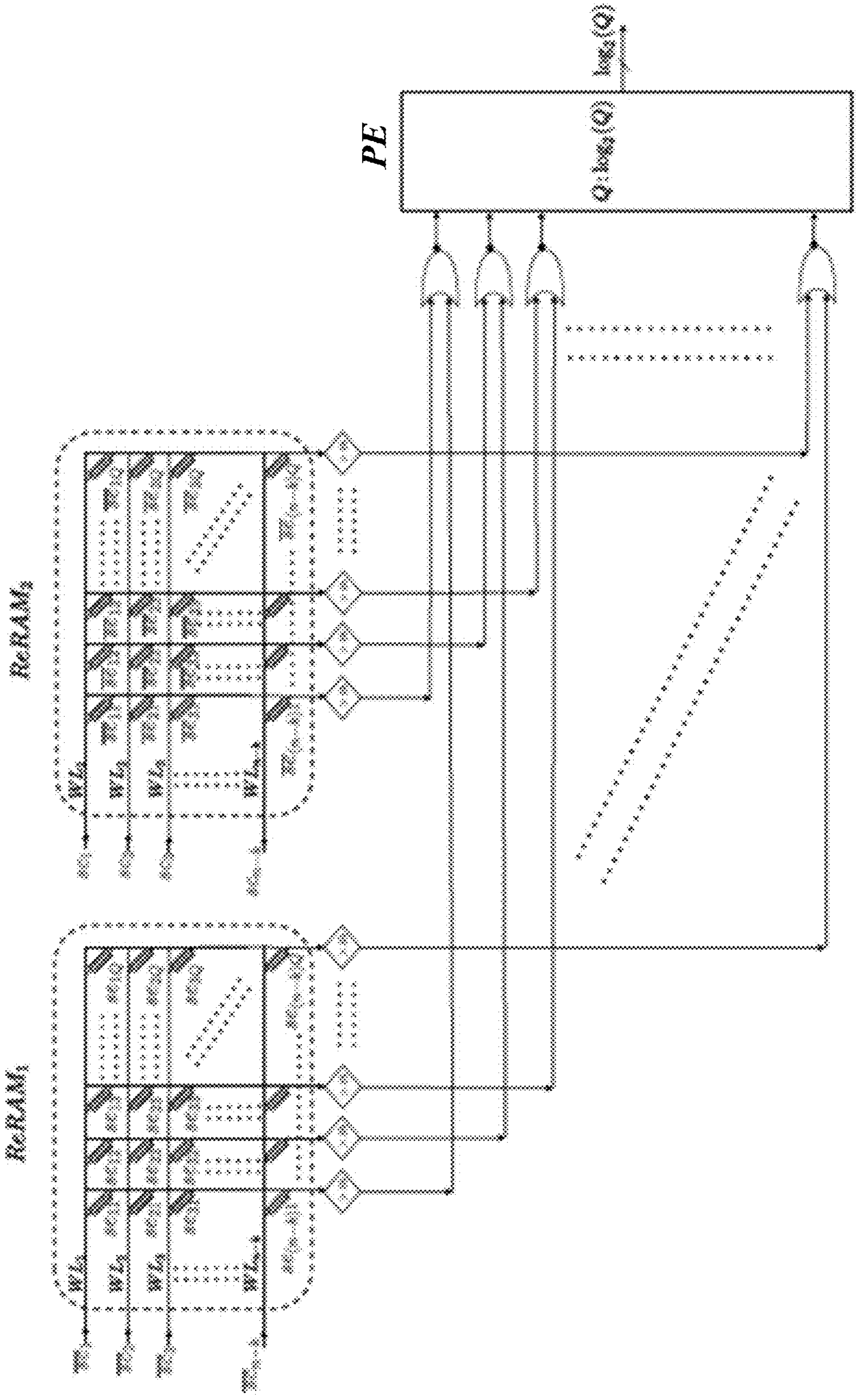
FIG. 9 shows an exemplary implementation of the GRAND algorithm by leveraging two ReRAMs to perform a codebook membership verification process according to one embodiment of the present invention.

FIG. 9 shows an exemplary implementation of the GRAND algorithm by leveraging two ReRAMs to perform the abovesaid simplified codebook membership verification. As shown, the first ReRAM ($ReRAM_1$) receives the complement syndrome $\overline{sc}$ as input and stores the (n−k)×Q-bit matrix of TEP syndromes (se), while the second ($ReRAM_2$) receives sc as input and stores the (n−k)×Q-bit matrix of complements of TEP syndromes ($\overline{se}$).

The outputs ($p_i$) of the first and second ReRAMs are NOR reduced and fed to the Q-to-$\log_2$ (Q) priority encoder (PE). Please note that the output of NOR will be 1 if and only if any TEP syndrome (se) stored in ReRAM has satisfied the codebook membership criterion (4). The priority encoder will output the $\log_2$ (Q)-bit address of the first TEP syndrome (se) that has satisfied the simplified codebook membership criterion, and the corresponding TEP syndrome can be retrieved from memory using that address.

Referring back to FIG. 2, the $\log_2$ (Q)-bit address can be used to access index memory 107 (see FIG. 2) and retrieve the indices of the non-zero elements of the TEP. The word-generation module 106 uses the HW×$\log_2$ (n)-bit index vector output by the index memory 107, where HW is the Hamming weight of the TEP (e), to flip the corresponding bits of the hard-decided vector ŷ from the communication channel and generate the estimated codeword ĉ.

In some embodiments, the TEP syndromes may be ordered, according to the Hamming weights of the corresponding TEPs, into one or more subsets. The one or more subsets of TEP syndromes are stored in the one or more sub-memories respectively. And the one or more subsets of TEP syndromes are evaluated by the one or more sub-memories with the codebook membership criterion based on the data vector syndrome respectively.

In one exemplary implementation, the subsets of TEP syndromes may be stored and evaluated by using volatile content addressable memory (CAM)-based CIM.

Figure 10:
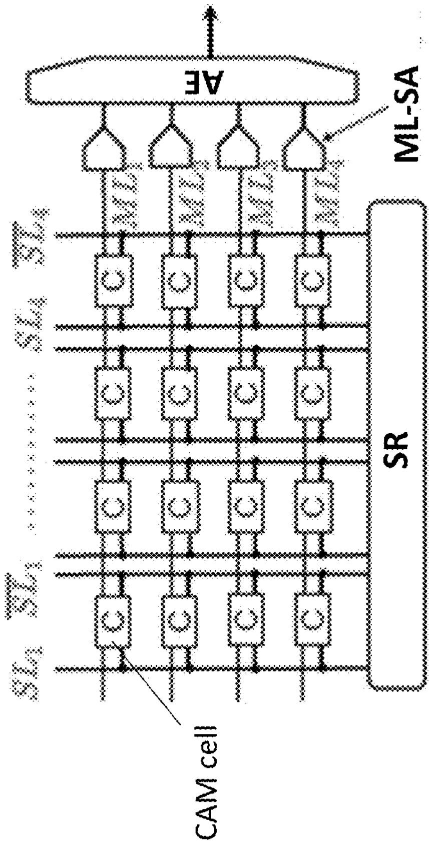
FIG. 10 shows a 4×4 content addressable memory (CAM) that can store 4 words, with each word consisting of 4 bits stored in CAM cells.

FIG. 10 shows a 4×4 CAM that can store 4 words, with each word consisting of 4 bits stored in CAM cells. The CAM is equipped with differential search lines (SL), match-line (ML), match-line sense amplifiers (ML-SA), and an address encoder (AE). The search process for a CAM commences with the loading of the search data (search key) into the search register (SR), followed by the pre-charging of the match lines to a high state and the broadcasting of the search word over the differential search lines. If the search key matches any of the CAM words, the corresponding ML remains charged while all other MLs are discharged. The corresponding address of the matched word is then output by the address encoder.

Figure 11:
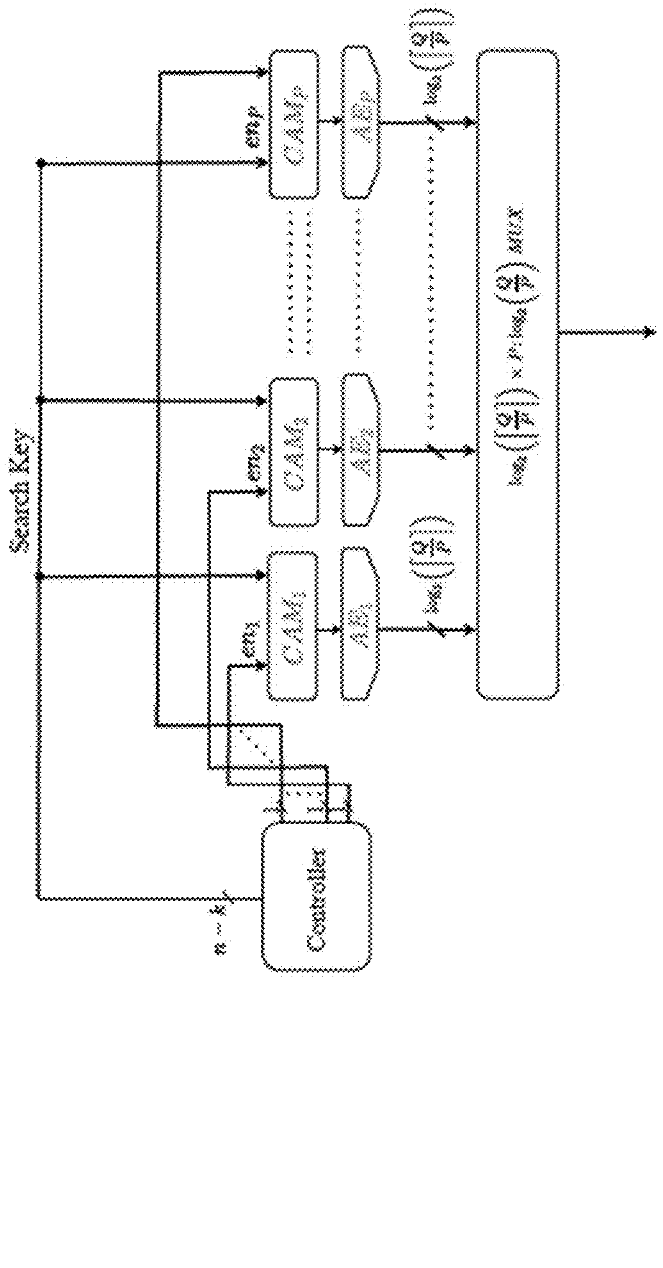
FIG. 11 shows an exemplary implementation of the GRAND algorithm by leveraging an array of CAM.

FIG. 11 shows an exemplary implementation of the GRAND algorithm by leveraging an array of Q×(n−k)-bit CAM, where Q is the CAM depth and (n−k) is the CAM width. Each CAM is configured to store a subset $$\left(\left\lceil \frac{Q}{P} \right\rceil\right)$$

of TEP syndrome (se). The syndrome (sc) of the received channel codes from the communication channel is loaded into the search register as a search key. If the search key (sc) matches any TEP syndromes (se) in the CAM, the corresponding match-line remains charged, while all other match-lines are discharged. The address-encoder (AE) returns the address of the corresponding matched TEP syndrome. In each clock cycle, the controller 104 activates a single CAM, and the search key (sc) is then applied to that particular CAM. Searching the search key across all P CAMs requires a total of P clock cycles. If the search key (sc) is found in any of the P CAM modules, the $$\log_2\left(\left\lceil \frac{Q}{P} \right\rceil\right) \times P\text{: } \log_2\left(\left\lceil \frac{Q}{P} \right\rceil\right)$$

multiplexer can be used to retrieve the address of the matching TEP syndrome (se).

The functional units and modules in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for decoding channel codes received from a noisy communication channel, the apparatus comprises:

- a demodulator configured to demodulate the received channel codes to obtain a demodulated data vector;
- a syndrome computer configured to compute a data vector syndrome for the demodulated data vector;
- a controller configured to receive the data vector syndrome, formulate a search key with the data vector syndrome respectively and to compute a complement of the data vector syndrome;
- a compute-in-memory comprising a first sub-memory configured to store a plurality of pre-computed test error pattern syndromes, a second sub-memory configured to store a plurality of complements of the test error pattern syndromes and a priority encoder configured to determine the test error pattern syndrome to be a candidate test error pattern syndrome that satisfy a codebook membership criterion; and the compute-in-memory being configured to:
  - receive the search key from the controller;
  - concurrently evaluate the plurality of test error pattern syndromes under the codebook membership criterion with the search key; and
  - determine an address of a candidate test error pattern corresponding to the candidate test error pattern syndrome; and
- a word-generation module configured to:
  - use the determined address to retrieve indices of non-zero elements of the candidate test error pattern; and
  - generate a candidate output codeword based on the retrieved indices of non-zero elements of the test error pattern and the input data vector.

2. The apparatus according to claim 1, wherein the demodulator configured to demodulate the received channel codes on basis of a hard-decision algorithm to obtain a hard-decided vector.

3. The apparatus according to claim 1, wherein the demodulator is configured to demodulate the received channel codes on basis of a soft-decision algorithm to obtain a soft-decided vector; and the apparatus further comprises a sorter module configured to: sort the individual elements of the soft-decided vector according to a reliability order of the plurality of individual elements of the soft-decided vector; and return a plurality of ordering indices for the plurality of individual elements of the soft-decided vector respectively.

4. The apparatus according to claim 3, wherein the reliability order is an ascending order of absolute values of the individual elements of the soft-decided vector.

5. The apparatus according to claim 3, wherein the controller is further configured to calculate a likelihood value for each of the one or more candidate output codewords based on the corresponding demodulated data vector;

the apparatus further comprises most likely candidate selection module configured to select a highest likelihood value by comparing the one or more likelihood values with a comparator tree; and the controller is further configured to identify, among the one or more candidate output codewords, a most likely candidate codeword that has the highest likelihood value.

6. The apparatus according to claim 1, wherein the plurality of test error pattern syndromes is ranked into the one or more subsets according to the Hamming weights of the corresponding TEPs thereof; and the compute-in-memory comprises one or more sub-memories, each configured to:

store a corresponding subset of test error pattern syndromes; and evaluate the corresponding subset of test error pattern syndromes with the codebook membership criterion based on the data vector syndrome.

7. The apparatus according to claim 6, wherein the compute-in-memory further comprises one or more address encoders, each coupled with a corresponding sub-memory and configured to generate an address of a test error pattern corresponding to a test error pattern syndrome, among a subset of test error pattern syndromes stored in the sub-memory, that satisfy the codebook membership criterion.

8. The apparatus according to claim 7, wherein each of the one or more sub-memories is a content addressable memory.

9. The apparatus according to claim 1, wherein the first sub-memory is further configured to perform, for each test error pattern syndrome, a bitwise-AND operation on the data vector syndrome with the complement of the test error pattern syndrome to obtain a first intermediate output;

the second sub-memory is further configured to perform, for each test error pattern syndrome, a bitwise-AND operation on the complement of the data vector syndrome with the test error pattern syndrome to obtain a second intermediate output; and the priority encoder is further configured to determine the test error pattern syndrome to be the candidate test error pattern syndrome if a summation of the first intermediate output and the second intermediate output yields a zero vector.

10. The apparatus according to claim 9, wherein each of the first sub-memory and second sub-memory is a resistive random-access memory.

11. A method for decoding channel codes received from a noisy communication channel, the method comprising:

demodulating the received channel codes;

decoding the one or more input codewords to obtain one or more candidate output codewords, each input codeword is decoded with a guessing random additive noise decoding algorithm to obtain a candidate output codeword by:

computing a syndrome for the input data vector;

formulating a search key with the data vector syndrome;

computing a complement of the data vector syndrome;

storing a plurality of test error pattern syndromes in a first sub-memory in the compute-in-memory;

computing a complement of each of the plurality of test error pattern syndromes;

storing the plurality of complements of test error pattern syndromes in a second sub-memory in the compute-in-memory;

evaluating the plurality of test error pattern syndromes under a codebook membership criterion with the search key;

determining an address of a candidate test error pattern corresponding to a candidate test error pattern syndrome that satisfy the codebook membership criterion;

using the determined address to retrieve indices of non-zero elements of the candidate test error pattern; and generating the candidate output codeword based on the retrieved indices of non-zero elements of the test error pattern and the input data vector; and wherein the plurality of test error pattern syndromes is pre-computed; and wherein the plurality of test error pattern syndromes is concurrently evaluated with the codebook membership criterion based on the data vector syndrome by the compute-in-memory.

12. The method according to claim 11, wherein the received channel codes are demodulated on basis of a hard-decision algorithm to obtain a hard-decided vector as the input data.

13. The method according to claim 11, wherein the received channel codes are demodulated on basis of a soft-decision algorithm to obtain a soft-decided vector as an input data; and sorting the plurality of individual elements of the soft-decided vector according to a reliability order;

returning a plurality of ordering indices for the individual elements of the soft-decided vector respectively.

14. The method according to claim 13, wherein the reliability order is an ascending order of absolute values of the plurality of the individual elements of the soft-decided vector.

15. The method according to claim 13, further comprises, after decoding the received channel codes from the communication channel to obtain the plurality of candidate output codewords:

calculating a likelihood value for each of the plurality of candidate output codewords;

selecting a highest likelihood value by comparing the likelihood values with a comparator tree; and identifying, among the candidate output codewords, a most likely candidate output codeword that has the highest likelihood value.

16. The method according to claim 11, further comprising:

ranking the plurality of test error pattern syndromes into one or more subsets;

storing the one or more subsets of test error pattern syndromes in one or more sub-memories in the compute-in-memory respectively;

evaluating the one or more subsets of test error pattern syndromes by the one or more sub-memories with the codebook membership criterion based on the data vector syndrome respectively.

17. The method according to claim 16, wherein the plurality of test error pattern syndromes is ranked according to Hamming weights of the corresponding test error patterns.

18. The method according to claim 11, wherein each test error pattern syndrome is evaluated by:

obtaining a first intermediate output by performing a bitwise-AND of the data vector syndrome with the complement of the test error pattern syndrome by the first sub-memory;

obtaining a second intermediate output by performing a bitwise-AND of the complement of the data vector syndrome with the test error pattern syndrome by the second sub-memory;

determining that the test error pattern syndrome satisfies the codebook membership criterion if a summation of the first intermediate output and the second intermediate output yields a zero vector.

* * * * *